United States Patent Office 2,935,992
Patented May 10, 1960

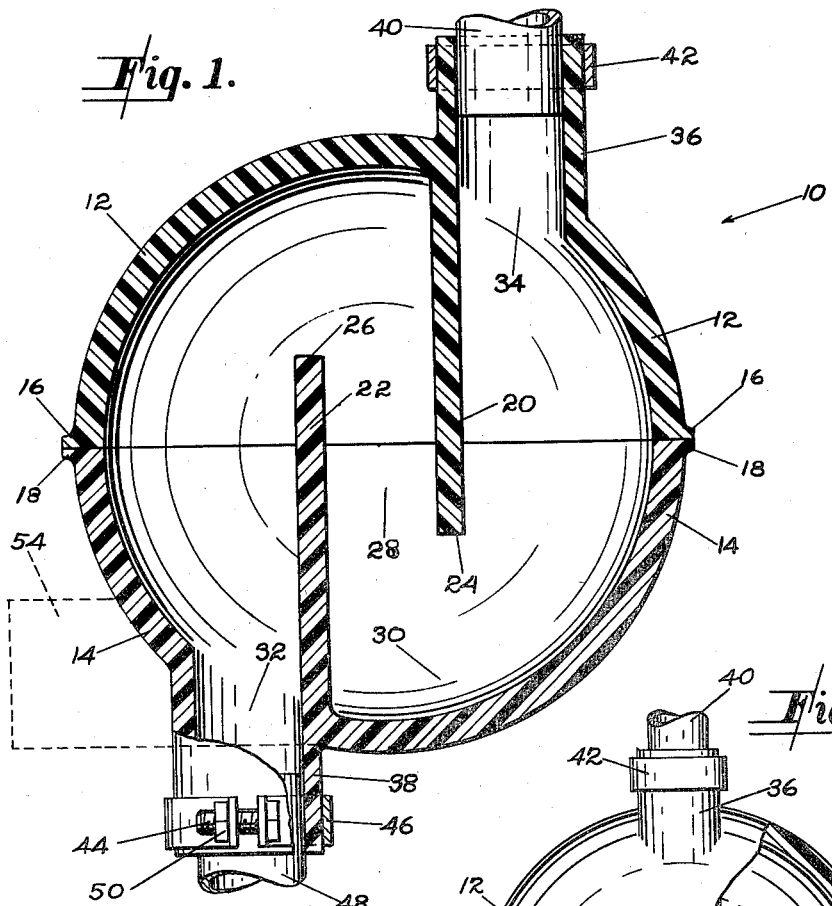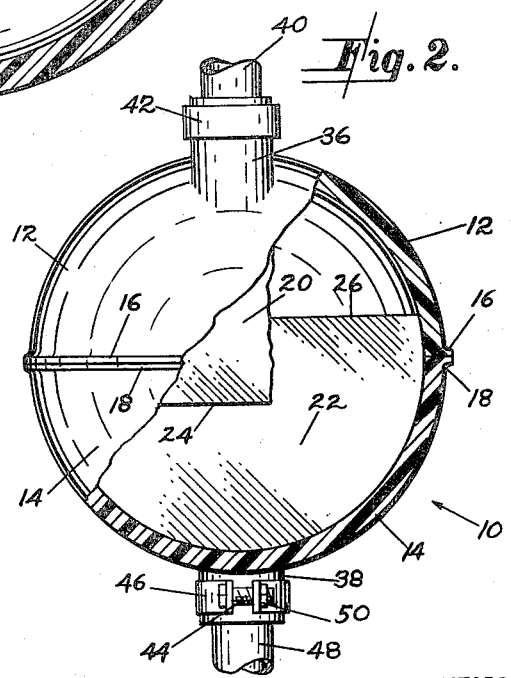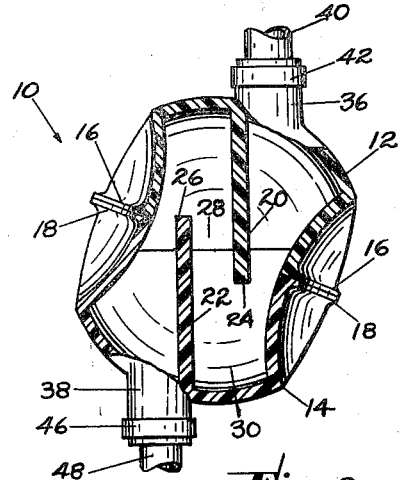
INVENTORS.
A. T. BARKER & G. M. YOUNG
BY Arthur H. Sturges.
Attorney

2,935,992

FLEXIBLE TRAP

Aaron T. Barker, Tekamah, and George M. Young, Oakland, Nebr., assignors of one-fourth to Chris F. Young, Tekamah, and one-fourth to Verner Magnusson, Oakland, Nebr.

Application May 11, 1956, Serial No. 584,238

1 Claim. (Cl. 137—247.11)

The instant invention relates to plumbing fixtures, and more particularly to traps used in conjunction with the drainage pipes of kitchen sinks and the like.

It is an object of the invention to provide a trap which may be cleaned of debris readily and without taking the trap apart, as heretofore practiced.

Another object of the invention is to provide a trap formed primarily of a suitable flexible material, such as rubber, or a selected one of the modern plastics having the characteristic that the plastic material is impervious to deterioration resultant from contact with soapy waste water carrying lye or other chemicals, such as is found in certain detergent preparations employed during the washing of dishes and the like, and which flows through the plumbing systems of dwellings from a kitchen sink.

A further object of the invention is to provide a trap, the parts of which are so cooperatively arranged with respect to the other parts thereof that the trap of the instant invention may be readily cleaned by squeezing the oppositely disposed flexible sides of the trap toward each other between the hands of an operator, for causing debris to be flushed out of the trap.

A still further object of the invention is to provide a trap for the foregoing purposes which is of an initially two-part construction for convenience of manufacture, said parts being joined together by a suitable means subsequent to the manufacture of said parts and prior to use.

Yet, another object of the invention is to provide a trap having sleeves formed integral with a flexible material of the trap, and in communication with the intake and outlet ports of the trap, respectively, together with a simple and inexpensive means for joining said sleeves to the outlet conduit of a sink and an intake conduit in communication with a sewer pipe, said means preferably including hose clamps.

Other and further objects and advantages of the invention will be understood from the following detailed description thereof.

In the drawings:

Figure 1 is a transverse sectional view of a preferred embodiment of the trap of the instant invention, certain portions thereof being broken away.

Figure 2 is a side view of the trap depicted in Figure 1, the view being taken at a right angle to the showing of the trap in Figure 1, certain portions of the sidewall of the trap being broken away and other parts shown in section, the view being taken at a reduced scale with respect to Figure 1.

Figure 3 is a view similar to Figure 1 at a reduced scale and showing oppositely disposed portions of the side wall of the trap compressed towards each other and the sleeves of the trap in full lines.

It is well known to the plumbing art that a trap must be constructed so that the interior thereof is accessible as heretofore practiced, since often jewelry and small valuables become lost in the drainpipes of sinks and the like through inadvertence or accident, the construction of said prior traps being such that they can be taken apart and valuables recovered therefrom since said traps prevent valuables from being carried to sewers in the streets and irrecoverably lost. Also, it is well known that prior traps employed become clogged with debris such as human hair, grit, coffee grounds and the like, whereby they must be taken apart for cleaning purposes, and the present invention aims to provide a trap which is adapted to achieve the useful purposes of the prior art traps with a minimum of manufacturing cost, together with the advantage that the trap of the instant invention may be flushed by squeezing the side walls thereof toward each other for removing debris therefrom.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout and in which the numeral 10 refers to the invention in its entirety. The trap of the instant invention is initially preferably of two-piece construction, comprised of two like half portions for ease and economy in manufacturing, said half portions being cemented or joined together by any suitable means prior to use.

The half portion 12 is preferably of like construction with respect to the half portion 14, each being preferably semi-globular in contour and formed of a suitable flexible material such as rubber. However, the said flexible material is preferably a suitable one of the modern plastics which has the characteristic that it is impervious to deterioration resultant from contact with waste water having soap, lye, and chemicals carried by said water. A preferred material is polythene.

The half portion 12 is preferably provided with an annular lip 16 and the half portion 14 is provided with a like annular lip 18, and in instances where the side walls of said portions are comparatively thin, said lips being joined together by means of a suitable adhesive substance or by vulcanization, in accordance with the flexible material employed, whereby the finished trap is globular in contour. The said lips provide a comparatively wide bearing for facilitating a joining of said half portions together.

The half portion 12 is provided with a transversely disposed partition or baffle plate 20, and the half portion 14 is provided with a similar baffle 22. Since the said half portions are molded in a die by manufacturing the trap of two-piece construction, the same facilitates withdrawing the cores of the die or mold during manufacture.

As best shown in Figure 1, the partition baffle 20 is vertically disposed during use, and extends approximately two-thirds of the distance across the interior of a trap, being provided with an edge 24. Similarly, the baffle 22 is provided with an edge 26. Preferably the baffles are formed integral with their respective half portions and are parallel with respect to each other during use, whereby passageway 28 is provided between them for communication between the sump portion 30 of the device and the outlet port 32 thereof.

The device further includes an intake port 34, which is in communication with the sump 30. The intake port 34 is in communication with the sleeve or upper nipple 36 and the outlet port 32 is in communication with a similar sleeve or lower nipple 38.

The sleeves are open ended and preferably are formed integral with their respective half portions and of the same material.

The two sections of the trap are cemented together to form a ball or sphere and in use the nipples are positioned in spaced vertically disposed planes.

Referring to Figure 1, the normally open end of the sleeve 36 receives therein an end of a drain pipe 40. The latter is in communication with the outlet of a sink or the like and a hose clamp, such as is employed on the radiator pipes of automobiles, and encircles the sleeve 36 and the drain pipe 40, said clamp being indicated at 42.

Similarly, a like clamp 46 is provided and disposed around the sleeve 38 of the outlet port 32. The sleeve 38 receives therein an end of a soil pipe 48 whereby at the time the bolt 44 of the hose clamp assembly 46 is caused to be tightened by means of manipulating the nut 50 of said assembly, the open spaced-apart ends of the hose clamp are caused to be drawn towards each other, as shown in Figure 1, for compressing the flexible material of the sleeve against the metallic soil pipe 48 and for locking the sleeve and soil pipe together, whereby water is prevented from leaking outwardly of the trap adjacent a junction of said sleeve and soil pipe. The hose clamp 42 is of like construction and employed for similar purposes.

As thus described, it will be understood that waste water and debris from the sink (not shown) descends to the sump 30 of the new trap, whereby any valuables accidentally received in the sump remain there since the baffle 22 causes the same, while at the same time the said waste water may flow through the tortuous passageway provided by said baffles between the intake and outlet ports, under the edge 24 of the baffle 20 and over the edge 26 of the baffle 22.

The said tortuous passageway is provided by means of said baffles, which are disposed vertical in use since the edge 24 of the baffle 20 is lower than the upper end portion or edge 26 of the baffle 22, as best shown in Figure 1. Since, during use, waste water stands in the sump, sewer gas is prevented from moving through the trap upwardly through the intake port 34 and prevented from entering the kitchen or other portion of the dwelling as is essential. At times when the sump becomes unduly clogged with debris, such as coffee grounds or the like, the operator squeezes the oppositely disposed wall portions of the trap towards each other between his hands or thumb and forefinger, for compressing said portions towards each other, as best shown in Figure 3 for flushing the sump of any undue amount of debris contained therein, and where necessary, for the said purpose, additional water may be run into the trap through the conduit 40 from said sink, and at this time the side wall portions of the trap are permitted to return to their initial normal position whereupon the operation is repeated until the sump is cleaned and without taking the trap apart.

For the removal of valuables from the sump, the hose clamps are released and the trap removed from its connection with the conduits 40 and 48 for permitting said valuables to fall outwardly of the trap during a manual rolling about of the trap by the operator.

Referring to Figure 1, the sleeve 38 may be disposed at a right angle with respect to the showing thereof in Figure 1, and to the position represented by the broken lines indicated at 54, during the manufacture of the half portion 14, for accommodation of installations requiring a discharge of waste water from the trap in a horizontal direction, in lieu of a downward vertical direction. At this time the end of the soil pipe 48 is disposed in a horizontal direction complemental to the horizontal position of the sleeve 38.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

We claim:

In a flexible trap, the combination which comprises a hollow rubber ball having vertically disposed upper and lower nipples extended upwardly and downwardly therefrom, the axes of the nipples being positioned in vertical planes spaced from the center of the ball and positioned on opposite sides of said center, said ball having spaced vertically disposed partitions extended across the interior and said partitions being in planes tangent to the inner surfaces of the nipples wherein unobstructed passages are provided through the nipples across the ball and to the inner surfaces of opposite sides thereof, the extended edges of said partitions being positioned across the center of the ball wherein material passing into the ball through the upper nipple passes downwardly around the lower edge of the partition at the inner surface of the upper nipple upwardly between the partitions, over the upper edge of the partition at the inner surface of the lower nipple, and downwardly through the lower nipple, and clamps on outer surfaces of the nipples.

References Cited in the file of this patent

UNITED STATES PATENTS

| | | |
|---|---|---|
| 473,062 | Dellinger | Apr. 19, 1892 |
| 2,484,031 | Havrenius | Oct. 11, 1949 |